J. T. SHUSTER.
Mineral Wick-Tip.

No. 217,417.               Patented July 8, 1879.

WITNESSES:                                INVENTOR
Saml. J. VanStavoren                      John T. Shuster
N. W. Bond                                By Connolly Bro., ATTORNEYS

UNITED STATES PATENT OFFICE.

JOHN T. SHUSTER, OF PHILADELPHIA, PENNSYLVANIA.

IMPROVEMENT IN MINERAL WICK-TIPS.

Specification forming part of Letters Patent No. 217,417, dated July 8, 1879; application filed May 2, 1879.

*To all whom it may concern:*

Be it known that I, JOHN T. SHUSTER, of Philadelphia, in the county of Philadelphia and State of Pennsylvania, have invented certain new and useful Improvements in Mineral Wick-Tips; and I do hereby declare the following to be a full, clear, and exact description of the invention, such as will enable others skilled in the art to which it pertains to make and use it, reference being had to the accompanying drawings, which form part of this specification, in which—

Figure 1:
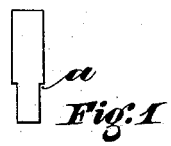
Figure 2:
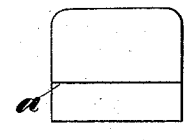
Figure 3:
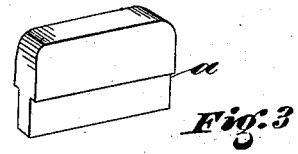

Figure 1 is a side elevation, Fig. 2 is a front elevation, and Fig. 3 is a perspective, of my invention.

My invention has for its object to provide a non-combustible wick-tip, which shall be of a porous character, so as to permit the free exercise of capillary attraction, and at the same time be less friable than mineral wicks usually are.

My invention accordingly consists of a wick-tip composed of ingredients which make it non-combustible and porous, and at the same time less friable than ordinary mineral wicks, said ingredients being so intermingled as to be found in every part of said tip, rendering the same alike in all its extent and uniform in its characteristics, whereby greater durability in the tip itself and increased illuminating properties in the light derived through it as a medium are obtained.

The base or foundation element of the wick-tip, and that which renders it non-combustible, is asbestus or any recognized equivalent mineral; but such non-combustible material, if used alone to form a wick-tip, is found to lack sufficient porosity to permit due capillary attraction, and hence I add another material to cure this defect. This material consists of fine sawdust, which should be as near the condition of flour as it is possible to bring it, and, at least, fine enough to pass through a screen having a hundred meshes or holes to the square inch.

To unite the sawdust with the asbestus, I employ a suitable mucilaginous substance, gum-arabic being particularly well adapted to the purpose, as it does not give off any offensive odor when the tip is in use, as other gummy substances which might be employed for the purpose do. The asbestus and gum-arabic being duly ground or pulverized are mixed in due proportions with the fine sawdust, and the mass brought by the addition of water to or about to the consistency of glazier's putty. The tips are then duly molded and dried, when they are ready for use, being commonly employed by fitting in the upper end of a metallic tube, which holds a cotton wick that extends down into the oil-reservoir, and is in contact at its upper end with the incombustible tip, such as is shown in Letters Patent No. 214,960, granted to me.

Owing to the superior porosity of a tip constructed according to the formula herein set forth, I have found that the flame-surface may be of greater area than the contact surface with the cotton-conducting wick. Hence in molding the tips I form them with a shoulder, (shown at *a* in the drawings,) the part below said shoulder being that which fits into the metallic tube of the lamp or burner, the part above being wider and thicker, and the illuminating-surface being thereby increased.

The proportions in which the aforementioned ingredients are employed are about as follows: mineral, eight parts; woody fiber, one part; mucilaginous matter, one part; water, a sufficient quantity; but these proportions may be varied to some extent, according to the quality and grade of the materials employed, within the skill and judgment of the compounder or molder.

The sawdust not only gives porosity to the tip, but strengthens the same and forms a binder for the asbestus.

While I conceive that the best results will be obtained by using sawdust of the fineness suggested, I do not, of course, limit myself to any precise degree therefor.

In lieu of sawdust other vegetable fiber may be employed, and any equivalent mineral and mucilaginous materials substituted for asbestus and gum-arabic.

What I claim as my invention is—

1. A wick-tip composed of mineral and vegetable fibers and a mucilaginous material, substantially as set forth.

2. A molded non-combustible wick-tip composed of asbestus, sawdust, and gum-arabic, in about the proportions specified.

In testimony that I claim the foregoing I have hereunto set my hand this 30th day of April, 1879.

JOHN T. SHUSTER.

Witnesses:
S. J. VAN STAVOREN,
CHAS. F. VAN HORN.